United States Patent [19]

Koshiyouji

[11] Patent Number: 4,879,604
[45] Date of Patent: Nov. 7, 1989

[54] IMAGE READING APPARATUS

[75] Inventor: Takashi Koshiyouji, Yokohama, Japan

[73] Assignee: Kabushiki Kaisha Toshiba, Kawasaki, Japan

[21] Appl. No.: 221,400

[22] Filed: Jul. 19, 1988

[30] Foreign Application Priority Data

Jul. 22, 1987 [JP] Japan ................ 62-182725

[51] Int. Cl.$^4$ .............................................. H04N 1/04
[52] U.S. Cl. ..................................... 358/474; 358/494
[58] Field of Search ............... 358/285, 293, 256, 294; 250/578

[56] References Cited

U.S. PATENT DOCUMENTS

| | | | |
|---|---|---|---|
| 4,275,423 | 6/1981 | Takahashi et al. | 358/293 |
| 4,630,127 | 12/1986 | Fijwa | 358/285 |
| 4,816,921 | 3/1989 | Akiyama | 358/285 |

Primary Examiner—Edward L. Coles, Sr.
Attorney, Agent, or Firm—Finnegan, Henderson, Farabow, Garrett and Dunner

[57] ABSTRACT

An image reading apparatus comprises an original table, a white plate located above the original table and having a predetermined light transmissivity and a predetermined light reflectivity, a lamp located above the white plate and used as a first light source for irradiating light to an original, placed on the original table, through the white plate, another lamp located below the original table and used as a second light source for irradiating light to the original, and a photoelectric converter for receiving the light passing through the white plate and the original, or the light reflected from the original, and converting the light into electric signals. Upon the pushing of a passing-light mode key incorporated in a console panel, the first light source is turned on and is moved, together with the photoelectric converter, in a straight line along the original table, in order to read the image formed on an original of the type through which light passes. Alternatively, when a reflected-light mode key is depressed, the second light source is turned on and is moved, together with the photoelectric converter in a straight line along the original table, in order to read the image formed on an original of the type from which light is reflected.

14 Claims, 4 Drawing Sheets

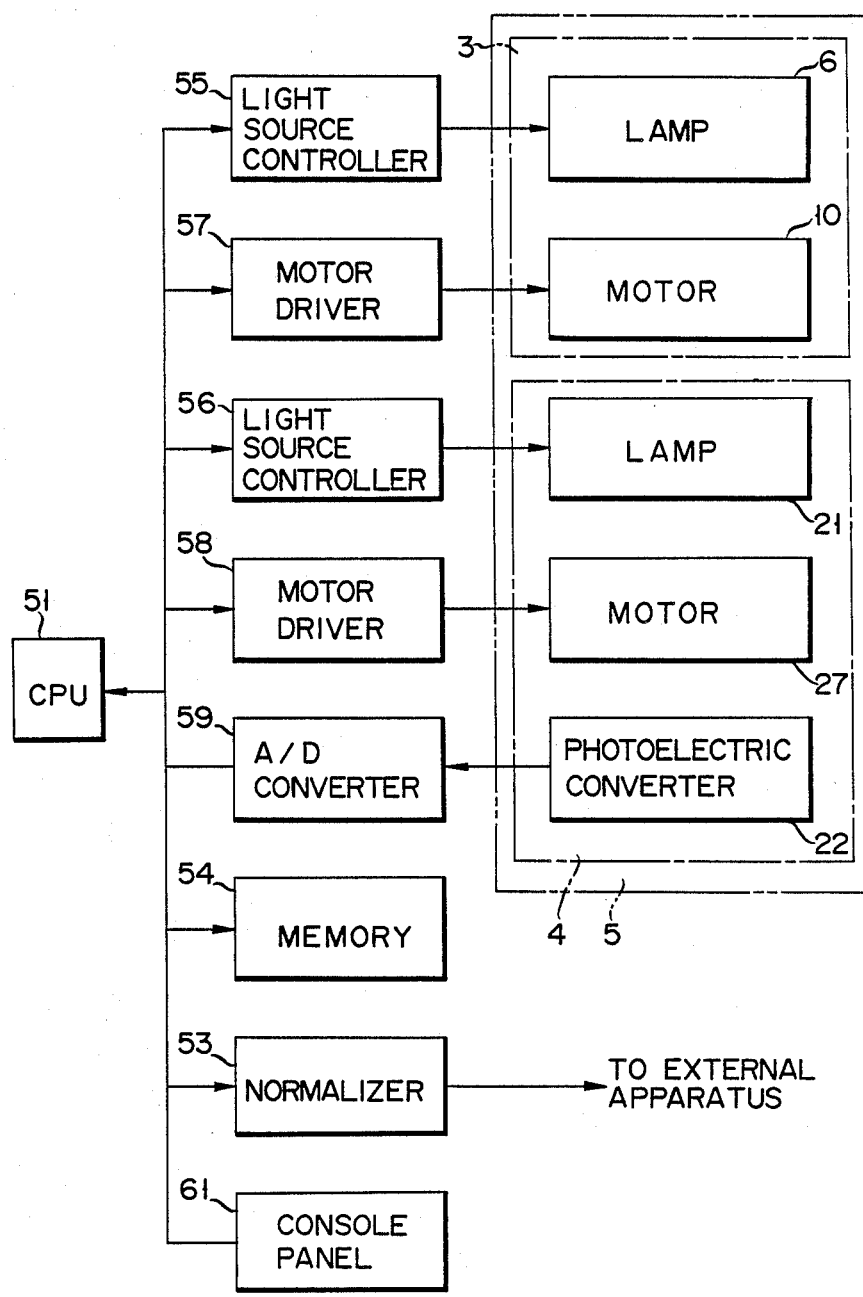
F I G. 4

IMAGE READING APPARATUS

BACKGROUND OF THE INVENTION

1. Field of the Invention

The present invention relates to an image reading apparatus which receives light reflected from, or passing through, an original, whereby it reads the image printed on the original and supplies image signals representing the image to an external apparatus such as a computer.

2. Description of the Related Art

As a result of the development, and now widespread availability, of personal computers able to process image data, a variety of image reading apparatuses has been developed, which are designed to input image data into such computers, and are now being used in increasing numbers. An example of such image reading apparatuses is that disclosed in U.S. Pat. No. 4,623,937, granted to J. Watanabe. This apparatus receives the light irradiated from a light source onto an original and reflected therefrom, and converts this reflected light into electric signals representing the image printed on the original. Also available is an image reading apparatus which receives and converts the light passing through an original into electric signals representing the image printed on the original.

Since, however, none of the conventional image reading apparatuses is able to read images by using either the light reflected from an original or else the light passing through it, i.e. they are confined to one or other of these modes, demand has therefore arisen for an image reading apparatus capable of operating in both the above-described modes.

When the original is a sheet of paper, the image printed thereon is normally read by way of the light reflected therefrom, while when it is a transparent film or sheet of OHP paper, the image thereon is read by way of the light passing through the original. While a positive image printed on a transparent film can also be read by way of the light reflected from the original, the image thus-obtained tends to have low resolution. This is because the light applied to the original cover (i.e., having a white surface) diffuses as it passes through the original cover, with the result that the image read on the basis of the light reflected from the film, in particular, fine detail, will inevitably be blurred. Thus, the positive image printed on a transparent film should ideally be read by way of the light passing through the film, as opposed to the light reflected therefrom.

As has been pointed out, no single conventional image reading apparatus can read an image by using either the light reflected from an original or else the light passing through it. Thus, two different image reading apparatuses must be used if it is required that images be read by way of light reflected from originals, as well as by light passing through originals.

SUMMARY OF THE INVENTION

Accordingly, it is the object of the present invention to provide an image reading apparatus which can read images by way of the light reflected from originals and also by way of the light passing through them, while keeping the originals unwarped and unwrinkled.

According to this invention, there is provided an image reading apparatus for reading image data formed on an original, which comprises means for placing an original having an image to be read, the original placing means being formed of a light-transmitting material and on which is placed, means for pressing the original placed on the original placing means thereagainst, the original pressing means having a predetermined light reflectivity and a predetermined light transmissivity, first light source for irradiating light to the original through the original pressing means, second light source for irradiating light to the original through the original placing means, and selection means for selecting one of the first and second light sources from which light is to be irradiated.

According to another aspect of the invention, an image reading apparatus for reading image data formed on an original is provided which comprises original table means for placing an original having an image to be read, the original table means being formed of a light-transmitting material, means for pressing the original placed on the original table means thereagainst, the original pressing means having a predetermined light reflectivity and a predetermined light transmissivity, light source for irradiating light to the original, placed on the original table means, through the original pressing means, first means for moving the light source along the original table means, photoelectric converting means for receiving the light irradiated by the light source and passing through the original pressing means and the original, converting the light into electrical signals, and outputting the electrical signals as image data, second means for moving the photoelectric converting means along the original table means, and means for causing the first and second moving means to move simultaneously along the original table means.

BRIEF DESCRIPTION OF THE DRAWINGS

FIG. 4 is a block diagram schematically illustrating the control system of the image reading apparatus shown in FIG. 1.

DETAILED DESCRIPTION OF THE PREFERRED EMBODIMENTS

Figure 1:
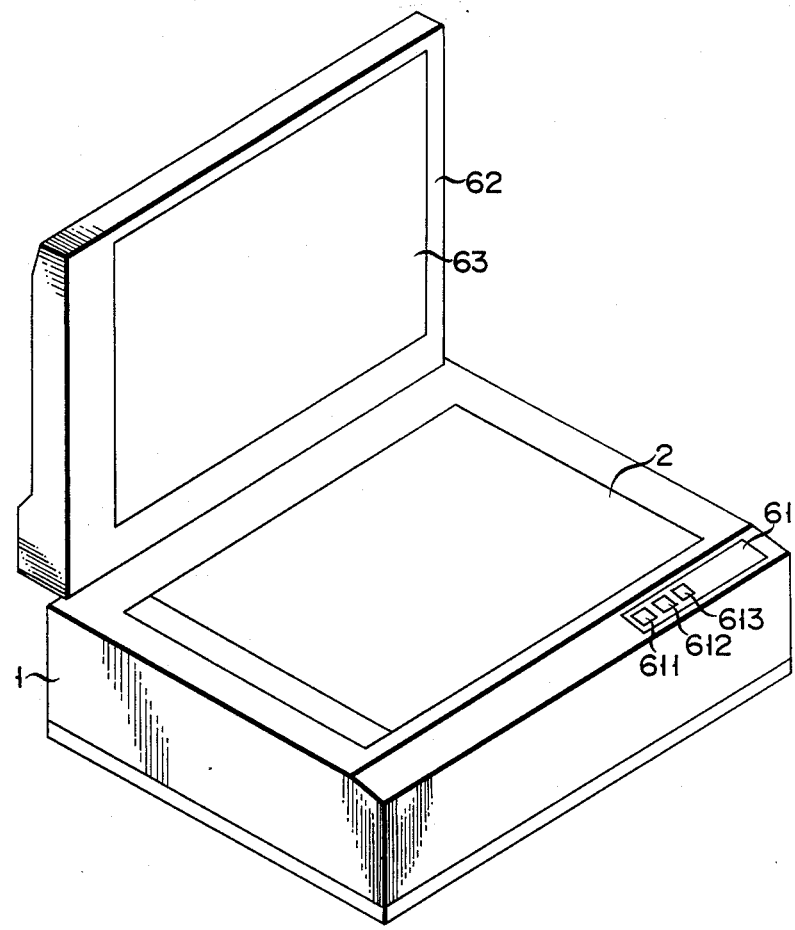
FIG. 1 is a perspective view of an image reading apparatus according to one embodiment of the present invention.
Figure 2:
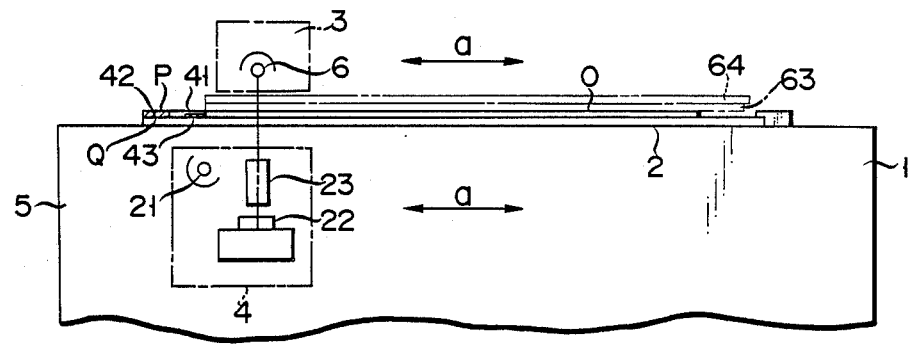
FIG. 2 is a side view schematically illustrating the internal structure of the image reading apparatus shown in FIG. 1.
Figure 3:
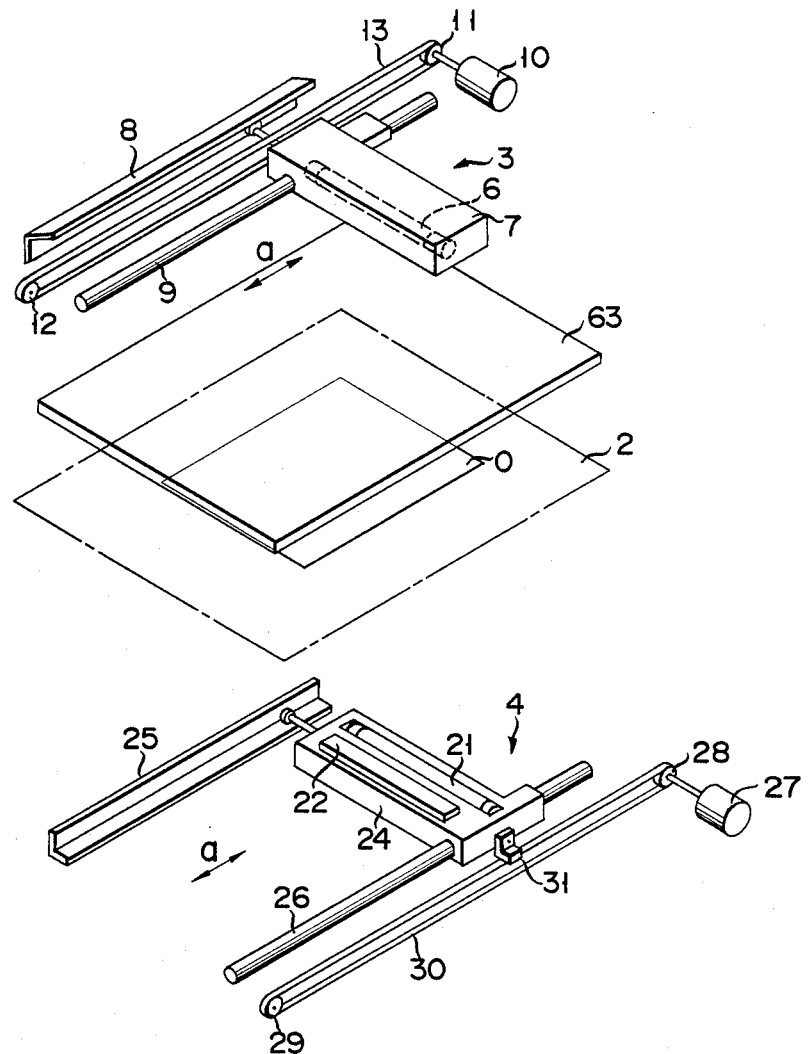
FIG. 3 is an exploded view showing the scanner-moving mechanism included in the original-scanning section of the apparatus shown in FIG. 1.

FIGS. 1 to 3 show an image scanner, i.e., an image reading apparatus according to the present invention. The image scanner is designed to read an image from the light reflected from a sheet of paper (i.e., an original), or from the light passing through a positive or negative film or through a sheet of OHP paper, and generates and supplies image signals representing the image, to an external apparatus such as a computer. As is shown in FIG. 1, the image scanner comprises box-shaped housing 1, original table 2 (i.e., platen glass) mounted on the upper surface of housing 1, and console panel 61 arranged on the inclined surface of housing 1. Original table 2 is a transparent glass plate.

As is illustrated in FIG. 2, the image scanner further comprises original-scanning section 5. Section 5 is composed of first scanner 3 and second scanner 4. First scanner 3 is located above original table 2 and contained in original cover 62, whereas second scanner 4 is provided within housing 1 and located below original table 2.

First scanner 3 can be moved back and forth along original table 2, in the direction of arrow a. As it is moved along original table 2, first scanner 3 optically scans an original O placed on original table 2. First scanner 3 comprises lamp 6 for illuminating the original O, and carriage 7 (in FIG. 3) for supporting lamp 6. Lamp 6 is, for example, a fluorescent lamp.

As is shown in FIG. 3, carriage 7 can move back and forth in the direction of arrow a, while being guided by guide rail 8 and guide bar 9. Motor 10, which can rotate in both forward direction and reverse direction, is located at one end of guide bar 9. Driving pulley 11 is connected to the shaft of this motor 10 (e.g., a stepper motor). Driven pulley 12 is located at the other end of guide gar 9. Timing belt 13 is wound around these pulleys 11 and 12. A fastener (not shown) fastens one portion of timing belt 13 to carriage 7. Hence, when motor 10 rotates in the forward direction or the reverse direction, carriage 7 is driven by timing belt 13, thus moving in a straight line.

As has been described, second scanner 4 is located below original table 2. It can move back and forth along the lower surface of table 2, in the direction of arrow a. As second scanner 4 moves in this way, it optically scans the original O set on original table 2. This scanner 4 comprises lamp 21 for illuminating the original O, photoelectric converter 22, optical system 23 for guiding the light reflected from or passing through, the original O to photoelectric converter 22, and carriage 24 supporting lamp 21, converter 22, and optical system 23. Lamp 21 is, for example, a fluorescent lamp. Optical system 23 includes, for instance, a converging lens.

Photoelectric converter 22 converts the light reflected from the original O or the light passing therethrough, into electric signals representing the image printed on the original O. Photoelectric converter 22 includes, as a main component, a CCD-type line image sensor. As is illustrated in FIG. 3, carriage 24 can move back and forth in the direction of arrow a, while being guide by guide rail 25 and guide bar 26. Motor 27 (e.g., a stepper motor), which can rotate in both forward direction and reverse direction, is located at one end of guide bar 26. Driving pulley 28 is connected to the shaft of this motor 27. Driven pulley 29 is located at the other end of guide bar 26. Timing belt 30 is wound around these pulleys 28 and 29. Fastening member 31 fastens one portion of timing belt 30 to carriage 24. Hence, when motor 27 rotates in the forward direction or the reverse direction, carriage 24 is driven by timing belt 30, thus moving in a straight line.

As is illustrated in FIG. 2, scale 41, light-passing ruler 42, and light-reflecting ruler 43 are fixedly mounted on original table 2.

Light-passing ruler 42 is used to set a reference value of passing-light intensity. Since ruler 42 contacts a portion of the surface of original table 2 (hereinafter referred to as "optical focal surface Q"), no dust chances to be on optical focal surface Q. Dust, if any, on the upper surface P of light-passing ruler 42 does not influence the reference value of passing-light intensity at all. Light-passing ruler 42 is relatively thick, and prevents the original O from touching the optical focal surface Q in a reading area of the reference value. Therefore, a sufficiently accurate reference value of passing-light intensity can be set.

As is shown in FIG. 1, original cover 62 is fastened at one side to the upper surface of housing 1, by means of a hinge (not shown), such that it can be opened and closed. White plate 63 is bonded to the inner surface of original cover 62. Plate 63 can be replaced with a white light-reflecting sheet of paper. Thus, when original cover 62 is closed after the original O has been placed on original table 2, light-reflecting plate 63 contacts the original O, flattening the original O and taking the creases therefrom.

White plate 63 has a predetermined light reflectivity and a predetermined light transmissivity so as to function as both a light-passing plate and a light-reflecting plate. For example, the reflectivity of white plate 63 is 50 to 90%, and the transmissivity thereof is 50 to 10%. The reflectivity and transmissivity of plate 63 are determined as above because, if the transmissivity exceeds the above range, a double image is liable to be caused, whereas if the reflectivity exceeds the range of 50 to 90%, the original O cannot be sufficiently illuminated with the light emitted from lamp 6. For example, white plate 63 is made of "Acrylite (trade name)" which is an acrylic plate manufactured by Mitsubishi Rayon Co., Ltd. and having a reflectivity of 50%, or "Dialite (trade name)" which is a polycarbonate plate manufactured by the same company and having a reflectivity of 80%.

In actual use, the transmissivity of white plate 63 must be selected in consideration of the intensity of the passing-through light from lamp 6 and the distance between lamp 6 and white plate 63. That is, the transmissivity of plate 63 is selected so that photoelectric converter 22 can receive light of a desired intensity. If the light emitted from lamp 6 is too intensive, the distance between lamp 6 and white plate 63 must be great. This causes the disadvantage that original cover 62 is inevitably increased in thickness since it contains lamp 6. This disadvantage can be eliminated by arranging filter 64 between lamp 6 and white plate 63, for example, to reduce the intensity of light.

It is difficult to manufacture while plates with their transmissivities finely controlled. On the other hand, filter 64 of any desired transmissivity can be manufactured easily. Therefore, the intensity of light received by photoelectric converter 22 is preferably adjusted by selecting the transmissivity of filter 64, rather than by selecting the transmissivity of white plate 63 and the distance between plate 63 and lamp 6.

FIG. 4 schematically shows the control system of the image scanner. The system comprises CPU 51, normalizer 53, memory 54, light source controllers 55 and 56, motor drivers 57 and 58, A/D converter 59, and console panel 61. CPU 51 is connected to normalizer 53, memory 54, controllers 55 and 56, drivers 67 and 58, A/D converter 59, and panel 61, so as to control these components.

As is shown in FIG. 1, console panel 61 has readstart key 611, reflected-light mode key 612, and passing-light mode key 613. When read-start key 611 is pushed, the image scanner starts reading an image from the original O. When key 612 is depressed, the image scanner is set in the reflected-light mode, whereby second scanner 4 can be operated. When key 613 is pushed, the image scanner is set in the passing-light mode, whereby first scanner 3 can be operated.

Normalizer 53 normalizes the digital image data converted from the light reflected from, or passing through, the original. That is, normalizer 53 corrects shading in the digital image data in accordance with the reference value of passing-light intensity or the reference value of reflected-light intensity, stored in memory 54. The reference value of passing-light intensity is represented by the digital data converted from the light which has passed through light-passing ruler 42. The reference value of reflected-light intensity is represented by the digital data converted from the light which has been reflected by light-reflecting ruler 43.

Light source controller 55 is connected to lamp 6, for turning lamp 6 on and off and controlling the amount of the light to be emitted from lamp 6. Similarly, light source controller 56 is coupled to lamp 21, for turning lamp 21 on and off and controlling the amount of the light to be emitted from this lamp 21. Motor driver 57 is coupled to motor 10, for driving this motor 10. Motor driver 58 is connected to motor 27, for driving motor 27. A/D converter 59 is connected to photoelectric converter 22, for converting the electric signals output by converter 22, into digital signals. These digital signals are supplied to CPU 51.

Figure 5:
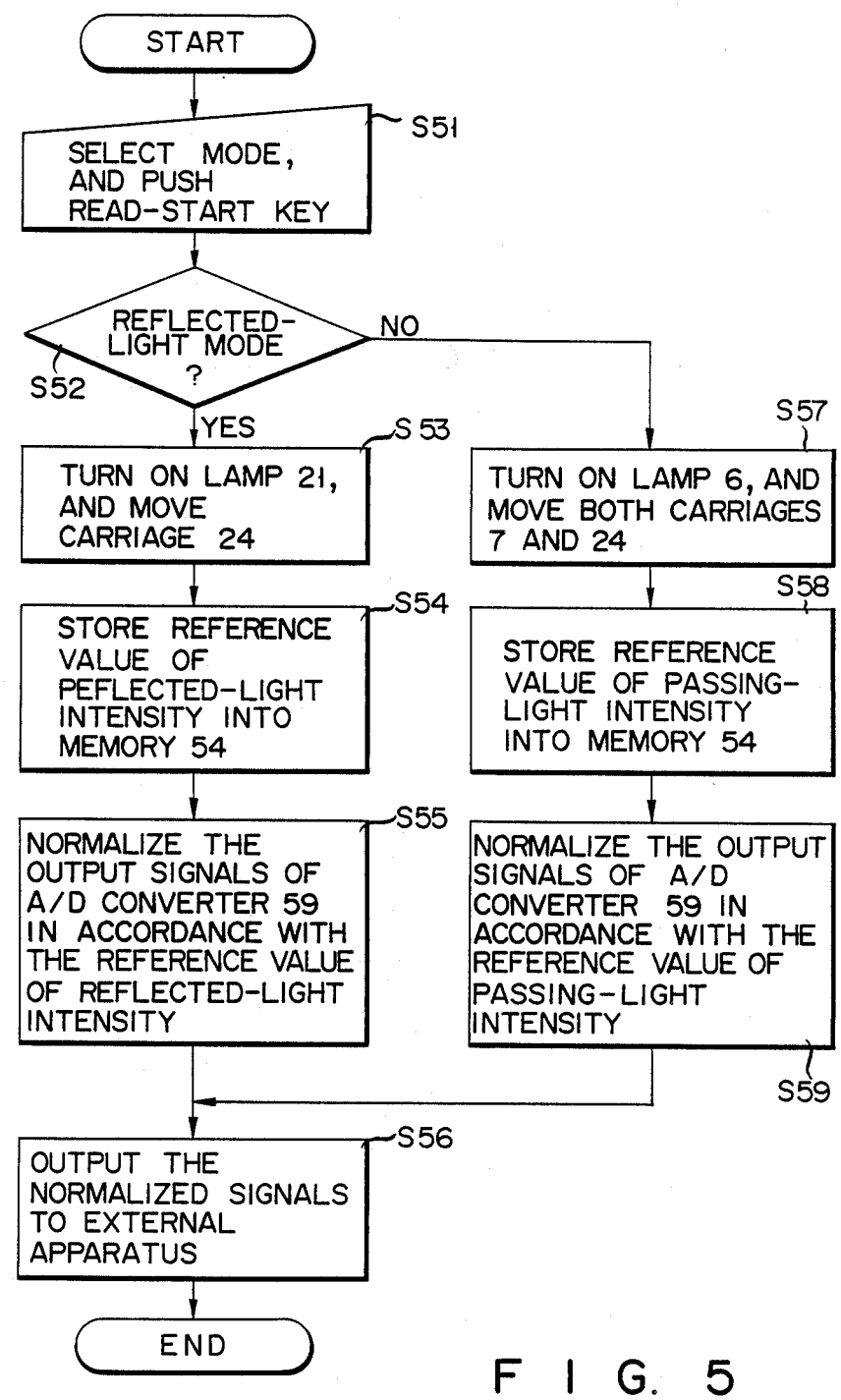
FIG. 5 is a flow chart explaining the operation of the image reading apparatus shown in FIG. 1.

The operation of the image scanner described above will now be explained, with reference to the flow chart of FIG. 5. First, an operator pushes key 612 or 613 of console panel 61, thus selecting either the reflected-light mode or the passing-light mode, then sets an original O on original table 2, closes original cover 62, and depresses read-start key 611 (Step S51).

Then, CPU 51 determines which mode, the reflected-light mode or the passing-light mode, has been selected, in accordance with which mode key, key 162 or key 613, has been pushed (Step S52). If the reflected-light mode has been selected, CPU 51 causes light source controller 56 to turn on lamp 21, and also causes motor driver 58 to rotate motor 27, thus moving carriage 24 (Step S53). Lamp 21 applies light through original table 2 to light-reflecting ruler 43 and the original O. The light is reflected from ruler 43 and the original O (or light-reflecting plate 63), and is then guided to photoelectric converter 22 by means of optical system 23. Photoelectric converter 22 converts the light into electric signals. These signals are supplied to A/D converter 59. A/D converter 59 converts the electric signals, which are analog signals, into digital signals.

Of the digital signals generated by A/D converter 59, those obtained from the light reflected from light-reflecting ruler 43 are stored into memory 54, as the data representing the reference value of reflected-light intensity (Step S54). On the other hand, those digital signals, which have been produced from the light reflected from the original O, are input to normalizer 53. Normalizer 53 normalizes these digital signals in accordance with the reference-value data stored in memory 54 (Step S55). The digital signals, thus normalized, are output to an external apparatus (not shown), as the data representing the image read from the original O (Step S56).

If CPU 51 determines, in Step S52, that the passing-light mode has been selected, CPU 51 causes light source controller 55 to turn on lamp 6, causes motor drivers 57 and 58 to rotate both motors 10 and 27, thereby moving both carriages 7 and 24 (Step S57). As a result, lamp 6 and photoelectric converter 22 are simultaneously moved in the same direction. While lamp 6 is moving, it applies light to light-passing ruler 42 and the original O. The light passing through ruler 42 and the light passing through the original O are guided to photoelectric converter 22 by means of optical system 23. Converter 22 converts the input light into electric signals. The electric signals are supplied to A/D converter 59. A/D converter 59 converts these signals, which are analog signals, into digital signals.

Of the digital signals output by A/D converter 59, those produced from the light passing through light-passing ruler 42 are stored into memory 54, as the data representing the reference value of passing-light intensity (Step S58). On the other hand, those digital signals, which have been generated from the light passing through the original O, are input to normalizer 53. Normalizer 53 normalizes these signals in accordance with the reference-value data stored in memory 54 (Step S59). The digital signals, thus normalized, are output to the external apparatus (not shown), as the data representing the image read from the original O (Step S56).

As has been described, the image scanner is able to read images from the light reflected from originals, and also from the light passing through originals. Thus, the original O is neither warped nor wrinkled, due to original cover 62, while it is being scanned by first scanner 3 or second scanner 4.

As has been described in detail, the image reading apparatus according to the present invention can read an image printed on an original, from the light reflected from the original and also from the light passing through the original, while keeping the original unwarped and unwrinkled.

The embodiment described above has two mode keys, one for selecting the reflected-light mode, and the other for selecting the passing-light mode. Needless to say, these keys can be replaced by a single mode key.

Further, in the foregoing embodiment, illumination lamp 6 is turned off in the reflected-light mode. If necessary, lamp 6 is turned on and moved simultaneously with lamp 21 in the reflected-light mode, so that white plate 63 may be backlit or illuminated from behind (above). In this case, the color of white place 63 is sensed to be more positively white and the total amount of light increases, which improves the contrast of the resulting image.

What is claimed is

1. An image reading apparatus for reading image data formed on an original, comprising:
    means for placing an original having an image to be read, said original placing means being formed of a light-transmitting material;
    means for pressing the original placed on said original placing means thereagainst, said original pressing means having a predetermined light reflectivity and a predetermined light transmissivity;
    first light source for irradiating light to the original through said original pressing means;
    second light source for irradiating light to the original through said original placing means; and
    selection means for selecting one of said first and second light sources from which light is to be irradiated.

2. The image reading apparatus according to claim 1, further comprising:
    photoelectric converting means for receiving either the light irradiated by said first light source and passing through said original pressing means and the original, or the light irradiated by said second light source and reflected from the original, converting the light into electrical signals, and outputting the electrical signals as image data;

first means for moving said first light source along said original placing means;

second means for moving said second light source and said photoelectric converting means along said original placing means; and means for turning said first light source on and causing said first and second moving means to move said first light source and said photoelectric converting means along said original placing means when said selection means selects said first light source, and for turning said second light source on and causing said second moving means to move said second light source and said photoelectric converting means along said original placing means when said selection means selects said second light source.

3. The image reading apparatus according to claim 1, wherein said original pressing means has a light transmissivity thereof set such that said photoelectric converting means can receive a predetermined amount of light.

4. The image reading apparatus according to claim 3, wherein said original pressing means has a light reflectivity of 50 to 90% and a light transmissivity of 50 to 10%.

5. The image reading apparatus according to claim 2, wherein said original pressing means has containing means for containing said first light source and said first moving means.

6. The image reading apparatus according to claim 1, further comprising filter means, interposed between said first light source and said original pressing means, for reducing light intensity.

7. The image reading apparatus according to claim 6, wherein said original pressing means has containing means for containing said first light source and said filter means.

8. The image reading apparatus according to claim 2, wherein said turning means turns said first light source on and causes said first and second moving means to move said first light source and said photoelectric converting means simultaneously along said original placing means when said selection means selects said first light source.

9. An image reading apparatus for reading image data formed on an original, comprising:

original table means for placing an original having an image to be read, said original table means being formed of a light-transmitting material;

means for pressing the original placed on said original table means thereagainst, said original pressing means having a predetermined light reflectivity and a predetermined light transmissivity;

light source for irradiating light to the original, placed on said original table means, through said original pressing means;

first means for moving said light source along said original table means;

photoelectric converting means for receiving the light irradiated by said light source and passing through said original pressing means and the original, converting the light into electrical signals, and outputting the electrical signals as image data;

second means for moving said photoelectric converting means along said original table means; and means for causing said first and second moving means to move simultaneously along said original table means.

10. The image reading apparatus according to claim 9, wherein said original pressing means has a light transmissivity thereof set such that said photoelectric converting means can receive a predetermined amount of light.

11. The image reading apparatus according to claim 10, wherein said original pressing means has a light reflectivity of 50 to 90% and a light transmissivity of 50 to 10%.

12. The image reading apparatus according to claim 9, wherein said original pressing means has containing means for containing said light source and said first moving means.

13. The image reading apparatus according to claim 9, further comprising filter means, interposed between said light source and said original pressing means, for reducing light intensity.

14. The image reading apparatus according to claim 13, wherein said original pressing means has containing means for containing said light source and said filter means.

* * * * *